(12) United States Patent
Nordberg (10) Patent No.: US 8,606,456 B2
(45) Date of Patent: Dec. 10, 2013

(54) METHOD FOR PROPELLING AN ARTICULATED TRACKED VEHICLE

(75) Inventor: Björn Nordberg, Örnsköldsvik (SE)

(73) Assignee: BAE Systems Hägglunds Aktiebolag, Örnsköldsvik (SE)

( * ) Notice: Subject to any disclaimer, the term of this patent is extended or adjusted under 35 U.S.C. 154(b) by 0 days.

(21) Appl. No.: 13/503,012

(22) PCT Filed: Sep. 21, 2010

(86) PCT No.: PCT/SE2010/051008
§ 371 (c)(1),
(2), (4) Date: Jul. 2, 2012

(87) PCT Pub. No.: WO2011/049509
PCT Pub. Date: Apr. 28, 2011

(65) Prior Publication Data
US 2012/0271521 A1 Oct. 25, 2012

(30) Foreign Application Priority Data
Oct. 20, 2009 (SE) ...................................... 0950773

(51) Int. Cl.
*B62D 55/20* (2006.01)

(52) U.S. Cl.
USPC ............. 701/29.3; 701/19; 701/20; 701/29.1; 701/29.2; 701/123; 701/124; 701/466

(58) Field of Classification Search
CPC .......... B62D 55/00; B62D 11/00; B62D 9/00; B62D 9/26
USPC .............. 180/6.7, 9, 9.28, 9.3, 184–193, 200; 238/14.05; 310/12.09; 701/19–20, 701/29.1–29.3, 123–124, 205, 466
See application file for complete search history.

(56) References Cited

U.S. PATENT DOCUMENTS

| 3,215,219 A | 11/1965 | Forsyth et al. |
| 4,117,906 A | 10/1978 | Mustered |
| 4,635,743 A | 1/1987 | Riehl |
| 4,645,023 A * | 2/1987 | Rea et al. .................... 180/9.32 |

(Continued)

FOREIGN PATENT DOCUMENTS

| DE | 4223296 A1 | 1/1994 |
| EP | 0424345 A1 | 4/1991 |

(Continued)

OTHER PUBLICATIONS

International Search Report and Written Opinion received for PCT Patent Application No. PCT/SE2010/051008, mailed on Feb. 9, 2011, 12 pages.

(Continued)

*Primary Examiner* — Mary Cheung
*Assistant Examiner* — Atul Trivedi
(74) *Attorney, Agent, or Firm* — Morrison & Foerster LLP (57) ABSTRACT

The invention relates to a method for propelling an articulated tracked vehicle (1) provided with at least a front and rear vehicle portion (2, 4), comprising a front drive shaft (6), which rotates a front track (8) on the front vehicle portion (2); a rear drive shaft (10), which rotates a rear track (12) on the rear vehicle portion (4), the front drive shaft (6) being disposed in the front vehicle portion (2) and the rear drive shaft (10) being disposed in the rear vehicle portion (4). At least one motor (20, 34, 36) rotates the respective front and rear drive shaft (6, 10) in order thus to propel the vehicle (1) at a speed in relation to a ground surface (16). The front drive shaft (6) is rotated at a first speed and the rear drive shaft (10) is rotated at a second speed, which first and second speeds are different, so that the front and rear tracks (8, 12) rotate at different speeds.

10 Claims, 6 Drawing Sheets

(56) References Cited

U.S. PATENT DOCUMENTS

| | | | |
|---|---|---|---|
| 7,341,541 B2 * | 3/2008 | Houtman et al. | 477/180 |
| 2004/0011574 A1 | 1/2004 | Borgwarth et al. | |
| 2006/0191168 A1 | 8/2006 | Casey et al. | |
| 2009/0005932 A1 * | 1/2009 | Lee et al. | 701/41 |

FOREIGN PATENT DOCUMENTS

| | | |
|---|---|---|
| WO | 2006/124554 A2 | 11/2006 |
| WO | 2009/059698 A2 | 5/2009 |

OTHER PUBLICATIONS

Extended European Search Report and Search Opinion received for EP Patent Application No. 10825280.0, mailed on Apr. 15, 2013, 5 pages.

Sasaki et al., "Articulated Tracked Vehicle with Four Degrees of Freedom", Journal of Terramechanics, vol. 28, No. 2/3, 1991, pp. 189-199.

* cited by examiner

METHOD FOR PROPELLING AN ARTICULATED TRACKED VEHICLE

CROSS REFERENCE TO RELATED APPLICATIONS

This is a U.S. National Phase patent application of PCT/SE2010/051008, filed Sep. 21, 2010, which claims priority to the Swedish Patent Application No. 0950773-2, filed Oct. 20, 2009, each of which is hereby incorporated by reference in the present disclosure in its entirety.

TECHNICAL FIELD

The present invention relates to a method for propelling an articulated tracked vehicle according to the preamble to patent claim 1.

BACKGROUND ART

There are articulated tracked vehicles which have a front and a rear vehicle portion which are linked together controllably by means of a control gear. The vehicle comprises one or more drive motors, which, via a transmission, distribute the power to the respective track of the vehicle. The output shafts from the transmission drive the drive shafts of the front and rear vehicle portions at an equally high rotation speed.

EP-A1-0424345 shows an articulated vehicle and a method for facilitating the propulsion of an articulated vehicle. When the driver is positioned in the front vehicle portion, the driver has difficulty in monitoring the movements of the rear vehicle portion, especially when the vehicle is turning. By providing the vehicle with a differential transmission, a greater drive power can be distributed to the front vehicle portion compared with the rear vehicle portion, which means that the rear vehicle will follow the motional direction of the front vehicle portion.

When articulated tracked vehicles of the above-stated type are propelled on a soft ground surface, such as snow or boggy ground, the drive power of the respective vehicle portion is determined by the maximally available drive power which the tracks can produce against the ground minus the oppositely directed driving resistance forces. The drive power which the tracks can produce is generated, inter alia, by the relationship between track slip and sinking of the tracks into the ground surface. This relationship is different for different ground surfaces and different vehicle configurations, such as track configuration and vehicle weight.

When an articulated tracked vehicle travels on a soft ground surface, the track of the rear vehicle portion will travel on a surface compacted by the track of the front car. If the front and rear tracks of the tracked vehicle rotate at the same speed, which is customary in conventionally constructed articulated tracked vehicles, the front and rear tracks will operate with a slip which is not optimal with respect to the efficiency and drive power of the vehicle, for either the front or rear vehicle portion.

When known articulated tracked vehicles turn, a similar drawback occurs. Where the control gear between the front and rear vehicle portion is designed such that the control point is displaced forward, the rear vehicle portion will travel with a smaller radius than the front vehicle portion in the course of a turn. In a turn, the rear vehicle portion thus pushes against the front vehicle portion, since the driveline, in the case of conventionally designed drivelines, is rigidly coupled and the axle transmissions and tracks of both vehicle portions are forced to rotate at the same speed. This means that the tracks have a tendency to lose grip against the surface when the vehicle is turning on slippery or soft ground surfaces. At the same time, the stress on the tracks is high, which means increased wear on the tracks and on the driveline, and increased rolling resistance of the tracks.

OBJECT OF THE INVENTION

One object of the present invention is to provide an articulated tracked vehicle which is propelled with optimal efficiency and drive power on different ground surfaces.

A further object of the invention is to provide an articulated tracked vehicle which exhibits stability during turning of the vehicle in order thus to reduce the risk of skidding of the vehicle and reduce wear and rolling resistance of the tracks of the vehicle.

DISCLOSURE OF INVENTION

The above-stated objects are achieved with the method according to patent claim 1.

Since the front and rear tracks are rotated at different speeds, the front and rear tracks will operate with a slip which is optimal with respect to the efficiency and drive power of the vehicle. At the same time, it is possible to provide an articulated tracked vehicle which exhibits stability during turning of the vehicle in order thus to reduce the risk of skidding of the vehicle and reduce wear and rolling resistance of the tracks of the vehicle. The optimization of the efficiency and the reduction in the rolling resistance also yields a reduction in the power requirement of the vehicle, which leads to lower fuel consumption and longer operating range with petrol, diesel or electric operation. The practicability of the vehicle also increases.

According to one embodiment of the invention, a regulating device controls the first and second speeds of the drive shafts of the vehicle as a function of measured speed of the vehicle. An optimal track slip can thus be set for a given ground surface and the speed at which the vehicle is traveling.

According to a further embodiment, the regulating device controls the first and second speed of the drive shafts of the vehicle as a function of measured driving torque of the respective drive shaft. An optimal track slip can thus be set for a given ground surface and the driving torque which is generated in the drive shafts of the vehicle.

According to another embodiment, the regulating device controls the first and second speed as a function of measured least difference in drive power effect between the front and rear drive shaft. By measuring the difference in drive power effect between each respective drive shaft, it is possible to obtain optimal track slip when the difference in drive power effect between the front and rear drive shaft is least.

According to another embodiment, the front drive shaft is rotated at a speed which is a multiple of the speed of the rear drive shaft. By choosing a number of preset multiples, it is possible to obtain an optimal efficiency and drive power for different operating conditions.

According to another embodiment, the multiple of the speed of the rear drive shaft can be chosen manually in dependence on the type of ground surface. By choosing between a number of preset multiples, personnel in the vehicle can manually adjust the vehicle to be propelled with optimal efficiency and drive power on different surfaces.

According to another embodiment, the first and second speeds are a function of or proportional to the mutual angle of the front and rear vehicle portions in relation to each other. The front and rear tracks will thus rotate at a speed which is optimal with respect to reduced risk of skidding of the vehicle and reduced wear and rolling resistance of the tracks of the vehicle.

BRIEF DESCRIPTION OF DRAWINGS

The invention is described in greater detail below with reference to the appended drawings showing preferred embodiments of the invention, in which.

MODE(S) FOR CARRYING OUT THE INVENTION

Figure 1:
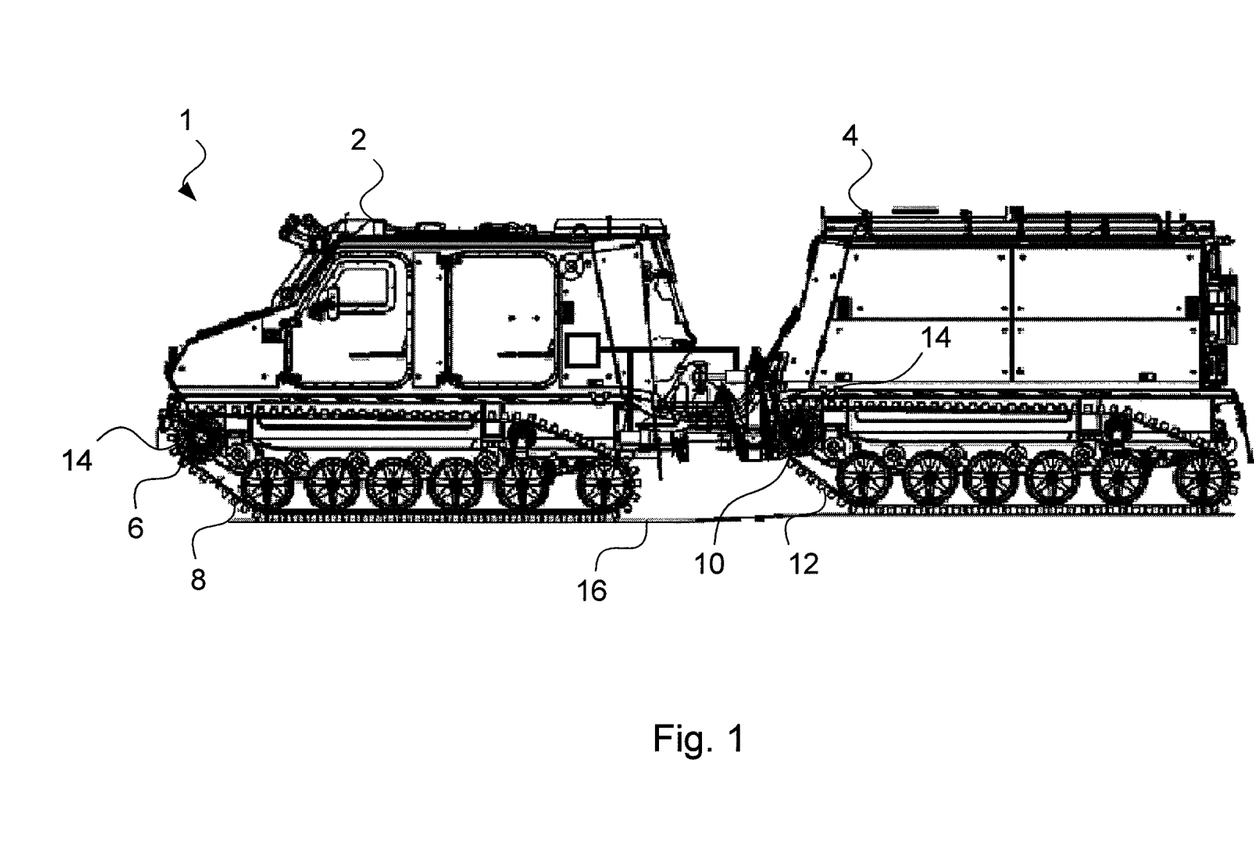
FIG. 1 shows a side view of an articulated tracked vehicle.

FIG. 1 shows an articulated tracked vehicle 1 provided with a front and rear vehicle portion 2, 4, comprising a front drive shaft 6, which rotates a front track 8 on the front vehicle portion 2, and a rear drive shaft 10, which rotates a rear track 12 on the rear vehicle portion 4. The front drive shaft 6 is disposed in the front vehicle portion 2 and the rear drive shaft 12 is disposed in the rear vehicle portion 4. Mounted on the respective drive shaft 6, 10 are drive wheels 14, which engage in the tracks 8, 12 and induce these to rotate in order thus to propel the vehicle 1 at a speed in relation to a ground surface 16.

When the articulated tracked vehicle 1 travels on a soft ground surface 16, the track 12 of the rear vehicle portion 4 will travel on a surface 16 compacted by the track of the front vehicle portion 2. If the front and rear tracks 8 and 12 of the tracked vehicle 1 rotate at the same speed, which is customary in conventionally constructed articulated tracked vehicles 1, the front and rear tracks 8 and 12 will operate with a slip which is not optimal with respect to the efficiency and drive power of the vehicle 1. The drive power which the tracks 8, 12 can produce is determined, inter alia, by the relationship between track slip and sinking of the tracks 8, 12 into the ground surface. This relationship is different for different ground surfaces 16 and different vehicle configurations, such as track configuration and vehicle weight. By track slip is meant skidding of the track 8, 12 against the ground surface 16. Track slip is expressed in percent. At 0% track slip, no skidding of the track 8, 12 against the ground surface 16 occurs.

According to the present invention, the front drive shaft 6 is rotated at a first speed and the rear drive shaft 10 is rotated at a second speed, which first and second speeds are different, so that the front and rear tracks 8 and 12 rotate at different speed. The front and rear tracks 8 and 12 can thus operate with a slip which is optimal with respect to the efficiency and drive power of the vehicle 1. This means also that the drive power can increase and the practicability on soft ground surface 16 can increase.

Figure 2:
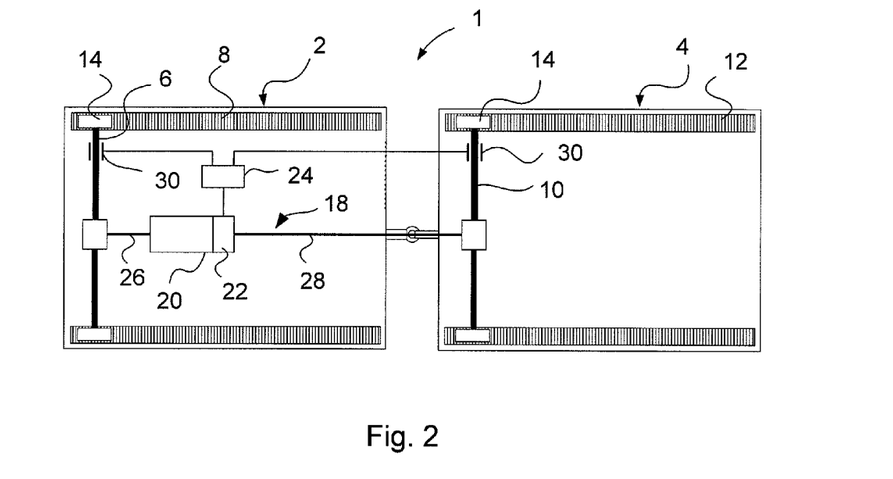
FIG. 2 shows a top view of an articulated tracked vehicle having a mechanical driveline.

FIG. 2 shows a top view of an articulated tracked vehicle 1 having a mechanical driveline 18. A drive motor 20, which can be an internal combustion engine or an electric motor, is coupled by a transfer case 22 to the front and rear drive shaft 6 and 10. The transfer case 22 is acted upon by a regulating device 24, which regulates the transfer case 22 such that the front drive shaft 6, via a first cardan shaft 26, is rotated at a first speed and such that the rear drive shaft 10, via a second cardan shaft 28, is rotated at a second speed. In the light of the above-stated, the first and the second speed shall be different, so that the front and rear tracks 8 and 12 rotate at different speed and so that the vehicle 1 is propelled with optimal efficiency and drive power on the ground surface 12.

According to one embodiment of the invention, the regulating device 24 controls the first and second speed of the drive shafts 6, 10 of the vehicle 1 as a function of measured speed of the vehicle 1. An optimal track slip can thus be set for a given ground surface 16 and the speed at which the vehicle 1 is traveling.

According to a further embodiment, the regulating device 24 controls the first and second speed of the drive shafts 6, 10 of the vehicle 1 as a function of measured driving torque of the respective drive shaft 6, 10. An optimal track slip can thus be set for a given ground surface 12 and the driving torque which is generated in the drive shafts 6, 10 of the vehicle 1.

According to another embodiment, the regulating device 24 controls the first and second speed as a function of measured least difference in drive power effect between the front and rear drive shaft 6 and 10. By measuring the difference in drive power effect between each respective drive shaft 6, 10, it is possible to obtain optimal track slip when the difference in drive power effect between the front and rear drive shaft 6 and 10 is least.

The speed of the vehicle 1, the driving torque of the drive shafts 6, 10 and the least difference in drive power effect between the front and rear drive shaft 6 and 10 can be measured by one or more sensors 30 disposed on the vehicle 1, which sensors transmit signals to the regulating device 24, which thus regulates the transfer case 22 in accordance with the signal values.

Instead of, or complementary to the detection by the sensor 30 of certain parameters which cause the regulating device 24 to regulate the transfer case 22, the front drive shaft 6 can rotate at a speed which is a multiple of the speed of the rear drive shaft 10. The multiples can be chosen manually in dependence on the type of ground surface 16 on which the vehicle 1 is traveling. By choosing between a number of preset multiples, personnel in the vehicle 1 can manually adjust the vehicle 1 to be propelled with optimal efficiency and drive power on different surfaces.

Figure 3:
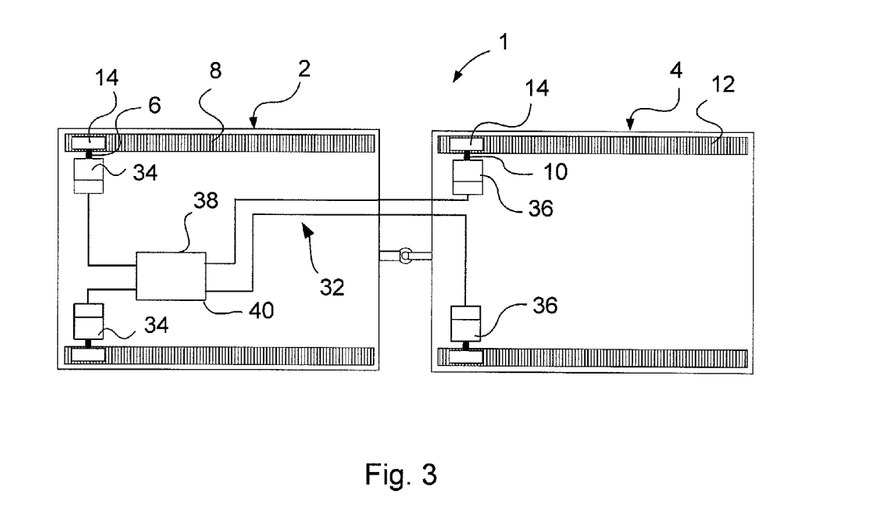
FIG. 3 shows a top view of an articulated tracked vehicle having an electric or hydraulic driveline.

FIG. 3 shows a top view of an articulated tracked vehicle 1 having an electric or hydraulic driveline 32, which can be electric and/or hydraulic. A pair of first motors 34 drives the front drive shaft 6 and a pair of second motors 36 drives the rear drive shaft 10. Each motor 34, 36 is hence coupled to a respective drive wheel 14. The motors 34, 36 can be electric or hydraulic. Where the motors 34, 36 are electric, they are driven with current through cables coupled to an accumulator 38. Where the motors 34, 36 are hydraulic, they are driven by a hydraulic motor 40. The vehicle according to FIG. 3 can be driven according to the principle which is described above in connection with FIG. 2.

Figure 4:
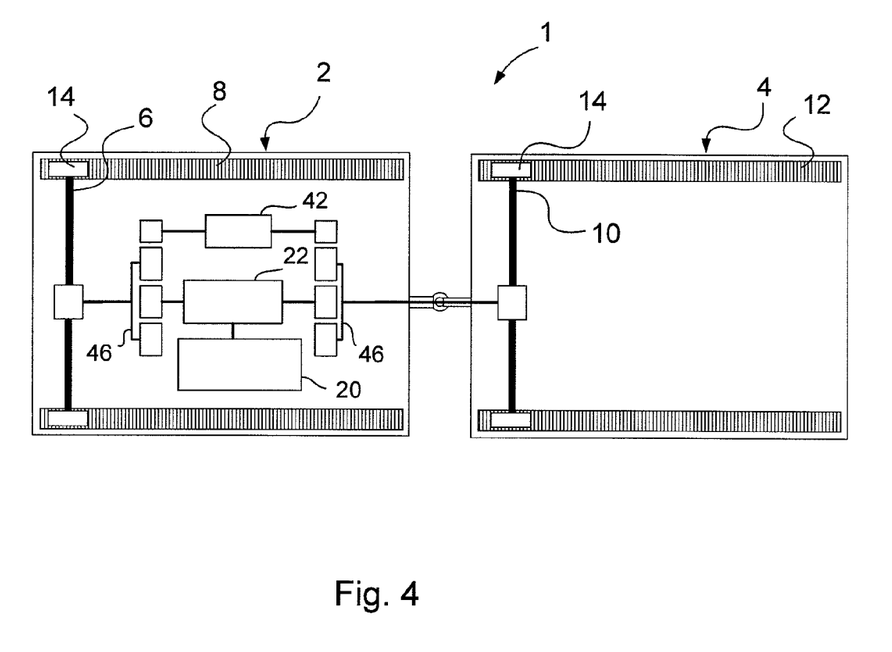
FIG. 4 shows a top view of an articulated tracked vehicle having a transfer case provided with a regulating mechanism.

FIG. 4 shows a top view of an articulated tracked vehicle 1 having a transfer case 22 provided with a regulating mechanism 42. The drive motor 20 drives the first and second drive shaft via the transfer case, the regulating mechanism 42 being coupled to a planetary gearing 46 disposed on the respective output shaft 44 from the transfer case 22 in order to control the speed from the transfer case 22 to the front and rear drive shaft 6, 10 by means of the regulating mechanism 42. The regulating mechanism 42 can be constituted by an electric motor, which is controlled by software in a mechanical-electrical manner. The regulating mechanism 42 can also be constituted by a software-controlled electric motor.

Figure 5:
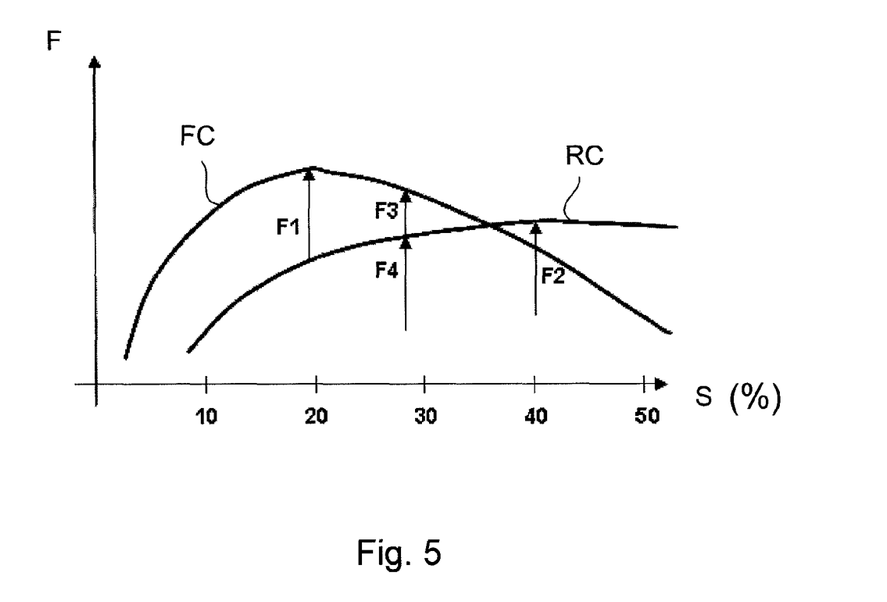
FIG. 5 shows a first graph depicting slip as a function of drive power.

FIG. 5 shows a first graph depicting slip as a function of drive power on a certain ground surface. The first curve FC represents the first vehicle portion 2 and the second curve RC represents the rear portion 4. It can be seen that the front portion 2 in this case has a higher possible available drive power F1 and with a lower slip than the drive power F2 of the rear portion 4. According to the present invention, the vehicle 1 will develop higher drive power F1+F2 than in conventional solutions F3+F4. Hence F1+F2>F3+F4, as can be seen from the graph in FIG. 5.

Figure 6:
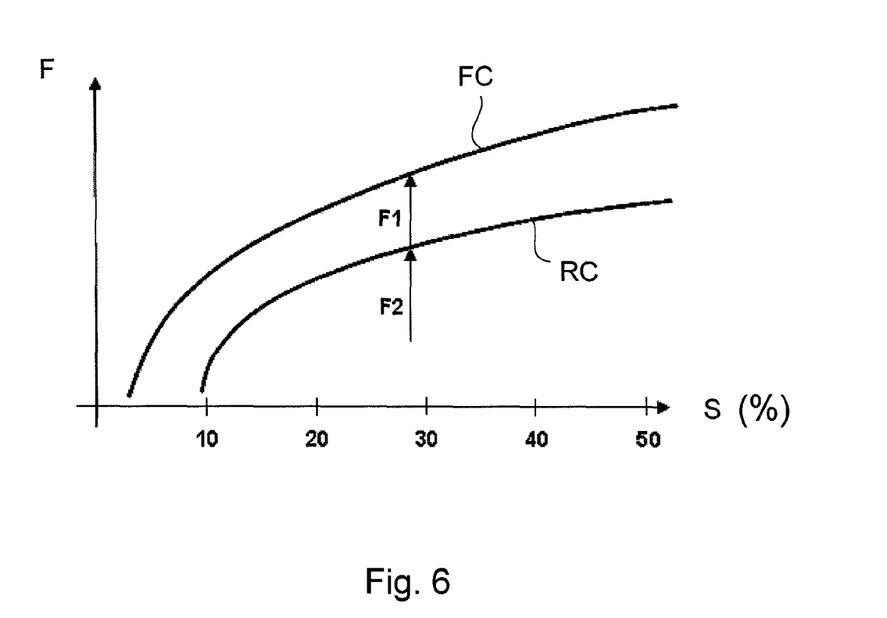
FIG. 6 shows a second graph depicting slip as a function of drive power.

FIG. 6 shows a second graph depicting slip as a function of drive power, in which the available drive powers F1 and F2 of the front and rear vehicle portions 2 and 4 increase with increased slip, and also that the front portion 2 has a higher possible available drive power than the drive power F2 of the rear portion 4. The first curve FC represents the front vehicle portion 2 and the second curve RC represents the rear portion 4. Since the drive shafts of conventional articulated tracked vehicles are forced to rotate at equal speed, none of the tracks of the vehicle portions will work at their optimal operating point at which maximal drive power is attained.

Figure 7:
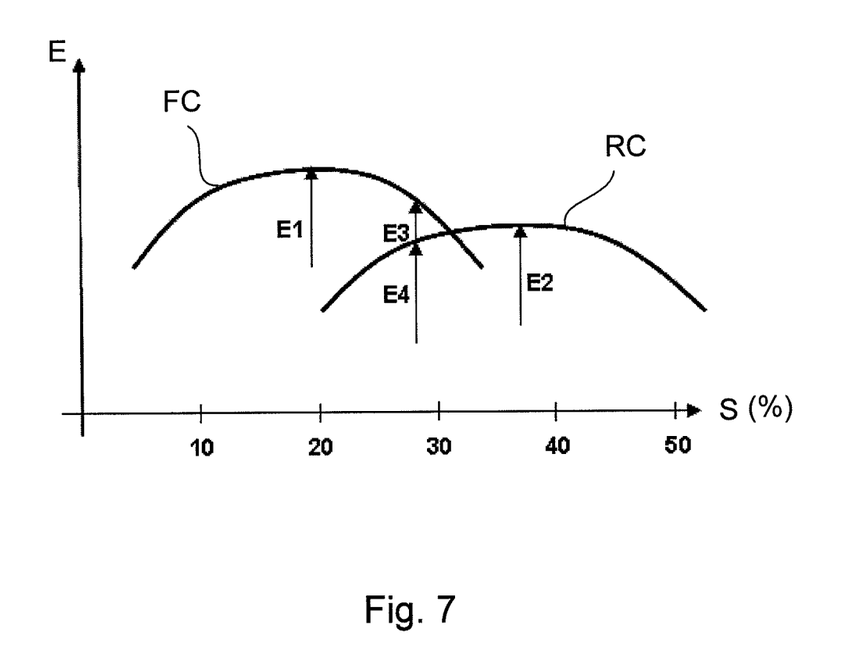
FIG. 7 shows a third graph depicting slip as a function of efficiency.

FIG. 7 shows a third graph depicting slip as a function of efficiency E. It can be seen from FIG. 7 that the efficiency for the propulsion of the respective vehicle portion 2, 4 has a maximum at a certain slip. The first curve FC represents the front vehicle portion 2 and the second curve RC represents the rear vehicle portion 4. It can be seen from the graph that the vehicle 1 having a drive principle according to the present invention can develop higher efficiency E1+E2 than conventional solutions E3+E4. Hence E1+E2>E3+E4, as can be seen from FIG. 7.

Figure 8:
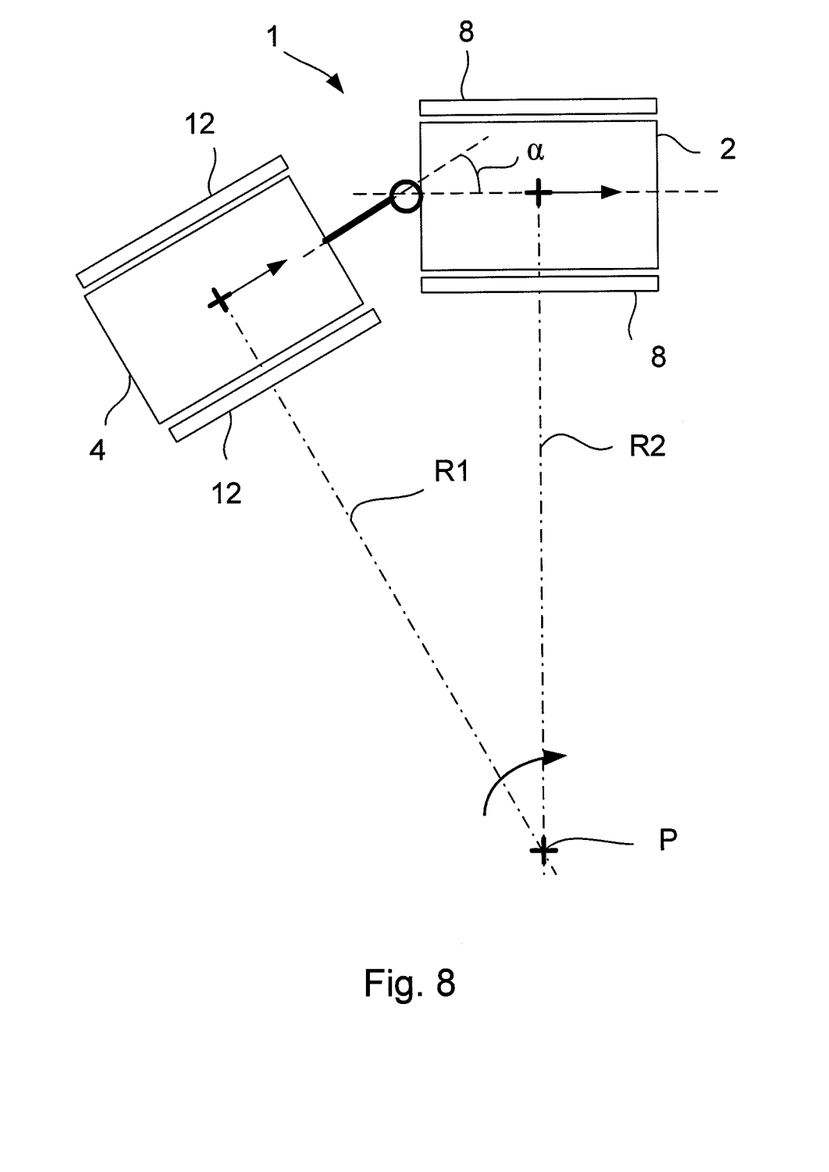
FIG. 8 shows a top view of an articulated tracked vehicle which is turning.

According to another embodiment, the first and second speeds of the drive shafts 6 and 10 of the vehicle are a function of or proportional to the mutual angle α of the front and rear vehicle portions 2 and 4 in relation to each other. In FIG. 8 is shown a top view of an articulated tracked vehicle 1 turning about a point P. It can be seen from FIG. 8 that the rear vehicle portion 4 is traveling with a turning radius R1 which is less than the turning radius R2 with which the front vehicle portion 2 is turning. Hence R1<R2. If the tracks 8, 12 of the front and rear vehicle portion 2 and 4 were to rotate at equally high speed, the rear vehicle portion 4 would push against the front vehicle portion 2 in the course of a turn. This means that the tracks 8, 12 have a tendency to lose grip against the ground surface 16 when the vehicle 1 turns on slippery or soft ground surfaces 16, so that an unwelcome slip occurs. At the same time, the stress on the driveline is high, which results in increased wear on the tracks 8, 12 and increased rolling resistance of the tracks 8, 12. By making the front and rear vehicle portions 2 and 4 operate at different speeds, the effect of the rear vehicle portion 4 pushing against the front vehicle portion 2 in the course of a turn is eliminated. The front and rear tracks 8 and 12 will thus rotate at a speed which is optimal with respect to reduced risk of skidding of the vehicle 1 and reduced wear and rolling resistance of the tracks 8, 12 of the vehicle 1.

The various embodiments which are described above can be mutually combined and used simultaneously on one and the same vehicle 1.

The invention claimed is:

1. A method for propelling an articulated tracked vehicle provided with at least a front and rear vehicle portion, the method comprising:
propelling a vehicle comprising:
a front drive shaft, which rotates a front track on the front vehicle portion;
a rear drive shaft, which rotates a rear track on the rear vehicle portion, the front drive shaft being disposed in the front vehicle portion and the rear drive shaft being disposed in the rear vehicle portion;
at least one motor, which rotates the respective front and rear drive shaft in order thus to propel the vehicle at a speed in relation to a ground surface,
wherein the front drive shaft is rotated at a first speed and the rear drive shaft is rotated at a second speed, which first and second speeds are different, so that the front and rear tracks rotate at different speed, and
wherein the first and second speed of the drive shafts of the vehicle are chosen such that the vehicle is propelled with higher efficiency and drive power on the ground surface, when comparing to a driving condition when the drive shafts of the vehicle rotate at the same speed.

2. The method as claimed in claim 1 wherein a regulating device controls the first and second speed of the drive shafts of the vehicle as a function of measured speed of the vehicle.

3. The method as claimed in claim 1, wherein a regulating device controls the first and second speed of the drive shafts of the vehicle as a function of measured driving torque of the respective drive shaft.

4. The method as claimed in claim 1, wherein a regulating device controls the first and second speed as a function of measured least difference in drive power effect between the front and rear drive shaft.

5. The method as claimed in claim 1, wherein the front drive shaft is rotated at a speed which is a multiple of the speed of the rear drive shaft.

6. The method as claimed in claim 5, wherein the multiple can be chosen manually in dependence on the type of ground surface.

7. The method as claimed in claim 1, wherein the first and second speeds of the drive shafts of the vehicle are a function of the mutual angle (α) of the front and rear vehicle portions in relation to each other.

8. The method as claimed in claim 1, wherein the motor is a drive motor, which drives the first and second drive shaft via a transfer case, a regulating mechanism being coupled to a planetary gearing disposed on the respective output shaft from the transfer case in order to control the speed from the transfer case to the front and rear drive shaft by means of the regulating mechanism.

9. The method as claimed in claim 1, wherein a first motor drives the front drive shaft and a second motor drives the rear drive shaft.

10. The method as claimed in claim 9, wherein each of the first and second motor is an electric motor.

* * * * *